(12) United States Patent
Lambert et al.

(10) Patent No.: US 9,841,048 B2
(45) Date of Patent: Dec. 12, 2017

(54) ROTATION ROD ASSEMBLY WITH SELF LUBRICATING LINER OR GROOVED BUSHINGS

(71) Applicant: ROLLER BEARING COMPANY OF AMERICA, INC., Oxford, CT (US)

(72) Inventors: Eric Lambert, Taylors, SC (US); Scott McNeil, Gilford, NH (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 15/060,702

(22) Filed: Mar. 4, 2016

(65) Prior Publication Data

US 2016/0258480 A1 Sep. 8, 2016

Related U.S. Application Data

(60) Provisional application No. 62/128,825, filed on Mar. 5, 2015.

(51) Int. Cl.
*F16C 7/06* (2006.01)
*B64C 1/14* (2006.01)
(Continued)

(52) U.S. Cl.
CPC .............. *F16C 7/06* (2013.01); *B64C 1/1407* (2013.01); *B64C 25/16* (2013.01); *F16C 17/246* (2013.01);
(Continued)

(58) Field of Classification Search
CPC ... F16C 7/06; F16C 7/02; B64C 25/16; B64C 25/60; Y10T 403/32975; Y10T 403/32213;
(Continued)

(56) References Cited

U.S. PATENT DOCUMENTS 2,740,000 A * 3/1956 Wierk ..................... B63B 59/04
174/138 R
2,837,177 A * 6/1958 Edge .................. F16L 27/0816
188/106 R
(Continued)

FOREIGN PATENT DOCUMENTS

CN 101413544 A 4/2009
CN 102036814 A 4/2011
(Continued)

OTHER PUBLICATIONS

Extended Search Report from corresponding EP Application No. 16158732.4, dated Feb. 10, 2017.
(Continued)

*Primary Examiner* — Thomas C Diaz
(74) *Attorney, Agent, or Firm* — Murtha Cullina LLP

(57) ABSTRACT

A rotation rod assembly includes a first linkage rod having a first bore extending therein. The rotation rod assembly includes a second linkage rod having a piston section extending axially therefrom, the piston section is disposed for rotation in the first bore. The piston section is axially restrained in the bore. The piston section has a self-lubricating liner secured to at least one outer surface thereof. The self-lubricating liner is in sliding engagement with portions of the bore. The liner is secured to the radially and/or axially outer surfaces of the piston section and has at least one groove therein for collection of wear materials and debris.

13 Claims, 9 Drawing Sheets

(51) Int. Cl.
*B64C 25/16* (2006.01)
*F16F 9/32* (2006.01)
*F16C 17/24* (2006.01)

(52) U.S. Cl.
CPC .......... *F16F 9/3214* (2013.01); *F16F 9/3278* (2013.01); *F16C 2208/32* (2013.01); *F16C 2223/70* (2013.01); *F16C 2326/43* (2013.01)

(58) Field of Classification Search
CPC .. Y10T 403/32983; F16G 15/08; E21B 17/05
See application file for complete search history.

(56) References Cited

U.S. PATENT DOCUMENTS

| | | |
|---|---|---|
| 3,674,075 A | 7/1972 | Hoegee |
| 3,945,695 A | 3/1976 | Speakman |
| 4,552,481 A * | 11/1985 | Bluett ..................... F16G 15/08 403/165 |
| 4,600,331 A * | 7/1986 | Gray ....................... F16G 15/08 403/165 |
| 4,765,757 A | 8/1988 | Hartl |
| 5,320,431 A | 6/1994 | Kallenberger |
| 5,325,732 A | 7/1994 | Vogel |
| 5,333,816 A | 8/1994 | Del Monte |
| 5,531,841 A | 7/1996 | O'Melia et al. |
| 7,527,872 B2 | 5/2009 | Steele et al. |
| 7,571,774 B2 | 8/2009 | Shuster et al. |
| 7,708,466 B2 | 5/2010 | Hsieh et al. |
| 8,267,351 B2 | 9/2012 | Brookfield |
| 9,140,302 B2 | 9/2015 | Kane |
| 2005/0242053 A1 | 11/2005 | Brabb et al. |
| 2007/0114746 A1 | 5/2007 | Tucker |
| 2008/0112658 A1 | 5/2008 | Justin |
| 2009/0279821 A1 | 11/2009 | Liu et al. |
| 2013/0196170 A1 | 8/2013 | Tomantschger et al. |

FOREIGN PATENT DOCUMENTS

| | | |
|---|---|---|
| CN | 102261381 A | 11/2011 |
| CN | 103256313 A | 8/2013 |
| CN | 203756738 U | 8/2014 |
| CN | 204089457 U | 1/2015 |
| CN | 105020258 A | 11/2015 |
| DE | 4327474 A1 | 3/1995 |
| DE | 10253279 A1 | 6/2003 |
| EP | 0713028 A1 | 5/1996 |
| EP | 2123923 A1 | 11/2009 |
| EP | 1993907 B1 | 12/2010 |
| EP | 2461055 A1 | 6/2012 |
| EP | 2495465 A1 | 9/2012 |
| FR | 2832773 A | 5/2003 |
| GB | 1128370 A | 9/1968 |
| GB | 2132578 A | 7/1984 |
| GB | 2494219 A | 3/2013 |
| JP | 09088941 A | 3/1997 |
| JP | 2008151297 A | 7/2008 |
| KR | 20090037317 A | 4/2009 |
| WO | 2009124543 A1 | 10/2009 |
| WO | 2014170636 A1 | 10/2014 |

OTHER PUBLICATIONS

Extended Search Report from corresponding EP Application No. 16201382.5, dated May 8, 2017.

* cited by examiner

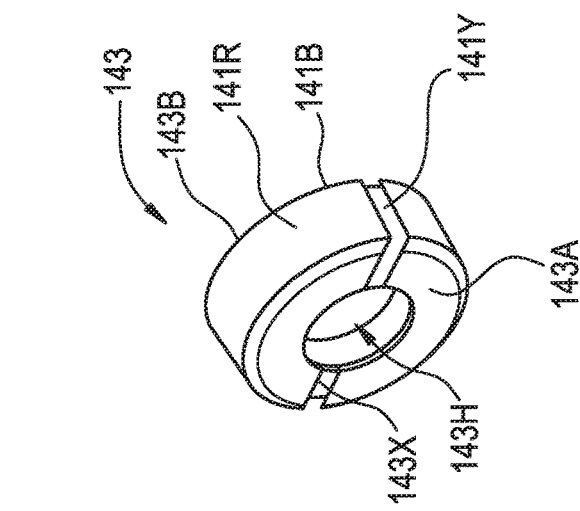
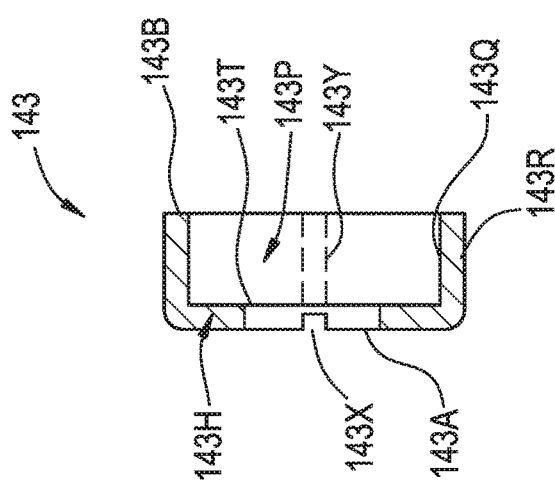
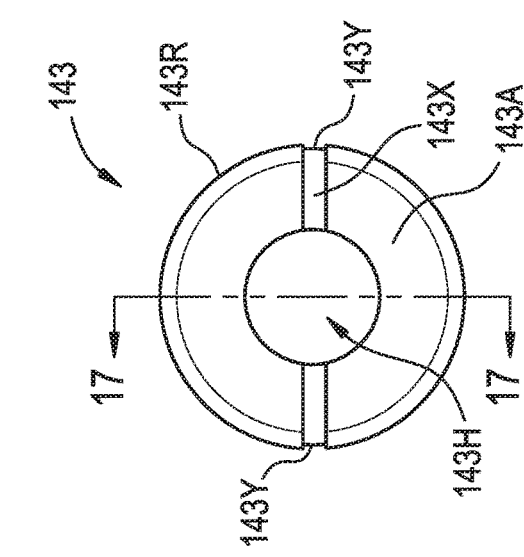

ROTATION ROD ASSEMBLY WITH SELF LUBRICATING LINER OR GROOVED BUSHINGS

CROSS REFERENCE TO RELATED APPLICATIONS

This application claims priority to U.S. Provisional Patent Application Ser. No. 62/128,825, entitled "Rotation Rod With Self Lubricating Liner," filed Mar. 5, 2015, the subject matter of which is incorporated herein by reference in its entirety.

FIELD OF THE INVENTION

The present invention relates generally to a rotation rod assembly and more specifically to a rotation rod assembly with a self-lubricating liner employed therein or a greased rotation rod assembly having grooved bushings configured to prevent bypass of grease flow.

BACKGROUND OF THE INVENTION

Various aircraft utilize landing gear that is deployed for landing and retracted during take-off of the aircraft. The landing gear is housed within a compartment on the aircraft that is covered by a landing gear door. The landing gear door generally rotates 180 degrees during retracting and deployment of the landing gear. The landing gear door is hingedly connected to the aircraft and is supported by a rotation rod. One end of the rotation rod is fixedly secured to the aircraft while an opposing end of the rotation rod rotates 180 degrees during opening and closing of the landing gear door. During opening of the landing gear door the rotation rod is subject to compressive forces. During closing of the landing gear door the rotation rod is under tension.

Typically, rotation rods are manufactured from an aluminum alloy for weight reduction considerations. The rotation rods include a fixed segment having a main bore extending partially into a first end thereof. A second end of the fixed segment has a fastening device such as a rod end and bearing secured thereto. An opening of the main bore may include a threaded area configured to receive a threaded plug having another bore extending therethrough. The rotation rod also includes a rotatable segment. The rotatable segment has a cylindrical bearing member secured to a first end thereof. The rotatable segment has fastening device such as a rod end and bearing secured to a second end thereof, for securing the rotation rod to the landing gear door. The cylindrical bearing member defines a radially outer surface that extends between a first axial end and a second axial end thereof which rotate relative to complementary surfaces in the main bore. Typically, sleeves and or bushings (e.g., metallic or plastic sleeves or bushings) are employed between the bearing member and the complementary surfaces in the main bore to reduce friction and to serve as a sacrificial wear member. A lubricant, such as grease, is typically employed in the bore to further reduce friction and wear between the bearing member and the complementary surfaces in the main bore. However, such rotation rods generally require periodic maintenance to maintain proper lubrication and/or to refurbish or replace the sleeves and/or bushings.

Attempts to employ self-lubricating polymers in place of the metallic sleeves or bushings has been unsuccessful because such polymers fail (e.g., plastically compress or deform) under compressive forces. In addition, the polymers have a high coefficient of friction especially when slidingly engaging materials such as aluminum alloys. The coefficient of polymers on aluminum alloys increases with decreasing contact pressure. Typically rotation rods have cylindrical bearing members with large surface areas to reduce contact pressures and wear. However, the coefficient of friction of polymers on aluminum alloys increases with decreasing contact pressure. Thus, those skilled in the relevant art have been discouraged from employing polymers for lubricants on rotation rods.

A prior art greased type rotation rod assembly 200 is shown in FIG. 12. The prior art greased rotation rod assembly 200 includes a fixed member 220 having an annular first body portion 222 and a second annular body portion 224. The second annular body portion 224 has an inner surface 226 defining a bore 228 axially extending partially into the second annular body portion 224. The prior art greased rotation rod assembly 200 includes a rotatable member 240 having a piston section 242 extending from a linkage arm 244. The piston section 242 is rotatingly secured in the bore 228, as described herein. The piston section 242 defines a first lobe 242A and a second lobe 242B separated from one another and connected to one another by a shaft 245. The first lobe 242A defines a first axially facing annular bearing surface 242X; and the second lobe defines a second axially facing annular bearing surface 242Y.

The piston section 242 has an opening 242Q at a terminal end thereof that is positioned in the bore 228. The opening 242Q extends axially into an interior area 242R of the piston section 242 and terminates at an inside end surface 242D.

The prior art greased rotation rod assembly 200 includes a plug 234 removably secured (e.g., the plug has male threads) and is threaded into a portion of the inner surface 226 (e.g., a female threaded portion). The plug 234 defines a passage 234P that extends axially therethrough. The rotatable member 240 extends through the passage 234P and is axially restrained by the plug 234 which as an axial end 238. A plurality of holes H extend radially outward through the piston section 242 from the interior area 242R to the bore 228. The prior art greased rotation rod assembly 200 includes a first sleeve 241 positioned between the first lobe 242A and an axial internal end 236 of the bore 228. The first sleeve 241 has an L-shaped cross section with an axially extending flange that defines a first flange bearing surface 241A. The first flange bearing surface 241A is in rotational sliding engagement with the first axially facing annular bearing surface 242X.

The prior art greased rotation rod assembly 200 includes a second sleeve 243 positioned between the second lobe 242B and plug 234. The second sleeve 243 has cylindrical cross section and an inwardly facing axial end that defines a second bearing surface 243A. The second bearing surface 243A is in rotational sliding engagement with the second axially facing annular bearing surface 242Y.

The prior art greased rotation rod assembly 200 also includes an opening 247 (e.g., a zerk fitting) for injecting a supply of a lubricant such as grease or oil into the bore 228. The grease injected into the opening tends for flow through the interior areas 242R and through the holes H into the bore 228 as indicated by the arrows P. However, the grease tends to short circuit between a radially inner surface of the second sleeve 243 and an outer surface 242K of the piston section 242 as indicated by the arrows P1. As a result, the second bearing surface 243A that is in rotational sliding engagement with the second axially facing annular bearing surface 242Y does not get a sufficient supply of grease and prematurely wears.

Thus, there is a need for an improved greased lubrication rod assembly.

SUMMARY OF THE INVENTION

In one aspect, the present invention resides in a rotation rod assembly. The rotation rod assembly includes a first linkage rod having a first annular body portion fixedly secured to and extending axially therefrom, the first annular body portion having an inner surface defining a first bore axially extending partially into the first annular body portion, the first annular body portion having a first axial end and second axial end, the first axial end being closed and the second axial end having an opening with a plug adjustably secured therein, the plug having a second bore extending therethrough, the first linkage rod being fixedly secured to a frame. The rotation rod assembly includes a second linkage rod having a piston section extending axially therefrom, the piston section being coaxial with the first linkage rod and the plug, the piston section being disposed for rotation in the first bore, the inner surface surrounding the piston section, the second linkage rod extending through the second bore and rotatable relative to the plug, the piston section being axially restrained by the first end and the plug; and the piston section having a self-lubricating liner secured to at least one outer surface of the piston section and the self-lubricating liner being in sliding engagement with portions of the inner surface, the first end and a portion of the plug. The liner is secured to the radially and/or axially outer surfaces of the piston section and has at least one groove therein for collection of wear materials and debris.

In another aspect, the present invention resides in a greased rotation rod assembly. The greased rotation rod assembly includes a first linkage rod having a first annular body portion fixedly secured to and extending axially therefrom, the first annular body portion having an inner surface defining a first bore axially extending partially into the first annular body portion, the first annular body portion having a first axial end and second axial end, the first axial end being closed and the second axial end having an opening with a plug adjustably secured therein, the plug having a second bore extending therethrough, the first linkage rod being fixedly secured to a frame. The greased rotation rod assembly includes a second linkage rod having a piston section extending axially therefrom, the piston section being coaxial with the first linkage rod and the plug, the piston section being disposed for rotation in the first bore, the inner surface surrounding the piston section, the second linkage rod extending through the second bore and rotatable relative to the plug, the piston section being axially restrained by the first end and the plug. The piston section has at least one of first bushing and second bushing secured to at least one outer surface of the piston section, at least one of the first bushing and the second bushing having a lubrication groove formed in an axially and a radially outer surface thereof, at least one of the first bushing and the second bushing being in sliding engagement with portions of the inner surface, the first end and a portion of the plug. The piston section includes a barrier for preventing flow of the grease inside the piston section. The greased rotation rod assembly includes a flow path for conveying grease around the piston section, the flow path comprising a first radial circuit in the first bushing, a first axial circuit in the first bushing, a second axial circuit around a radial outer surface of the piston section, a third axial circuit in the second bushing, and a second radial circuit in the second bushing.

BRIEF DESCRIPTION OF THE DRAWINGS

FIG. 16 is an end view of a second bushing installed in the greased rotation rod assembly of FIG. 13;

FIG. 17 is a cross sectional view of the second bushing of FIG. 16 taken across line 17-17 of FIG. 16;

FIG. 18 is a perspective view of the second bushing installed in the greased rotation rod assembly of FIG. 13.

DETAILED DESCRIPTION

Figure 1:
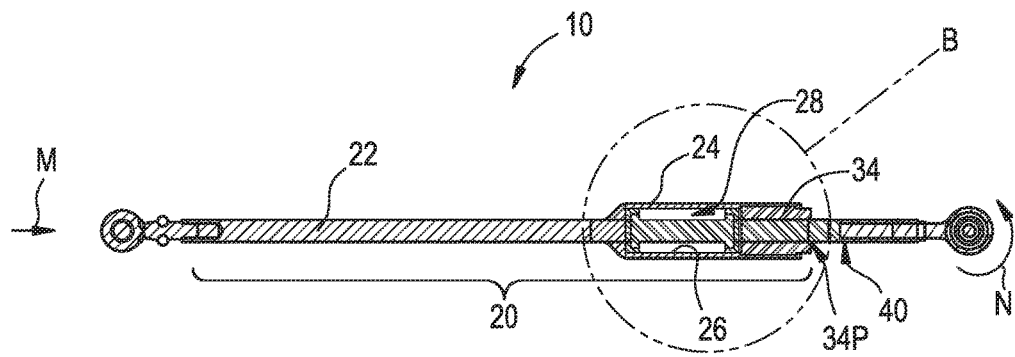
FIG. 1 is a side view of the PTFE lined rotation rod of the present invention.
Figure 2:
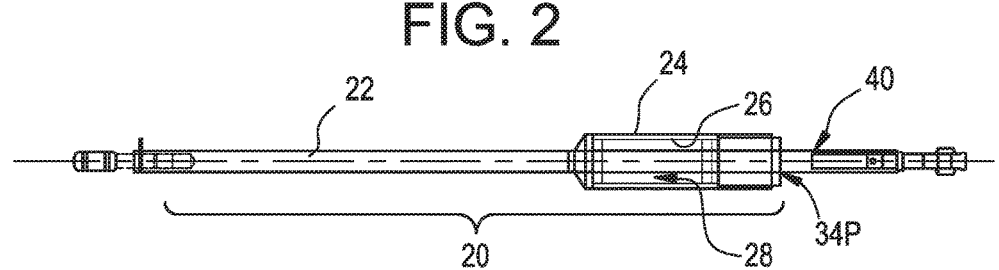
FIG. 2 is a top view of the PTFE lined rotation rod assembly of FIG. 1.
Figure 3:
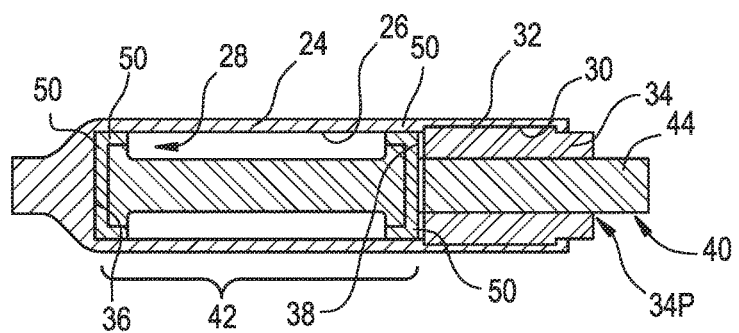
FIG. 3 is an enlarged view of detail B of FIG. 1.
Figure 4:
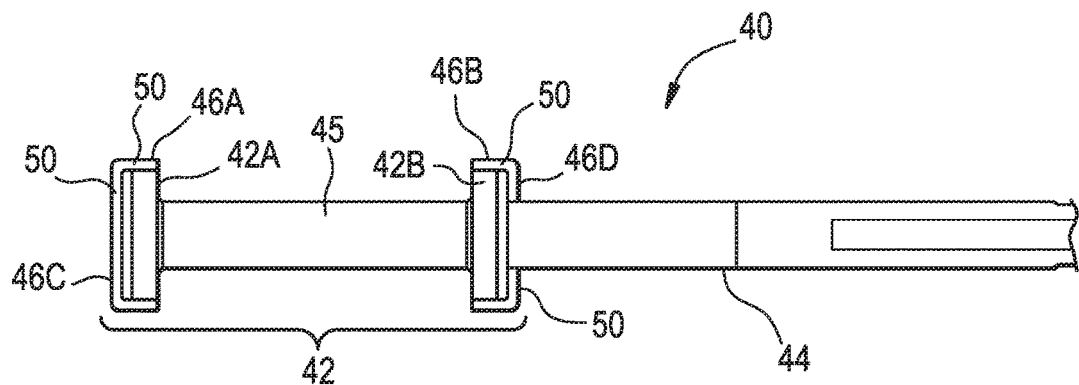
FIG. 4 is an enlarged view of a portion of the rotatable member of FIG. 1.
Figure 5:
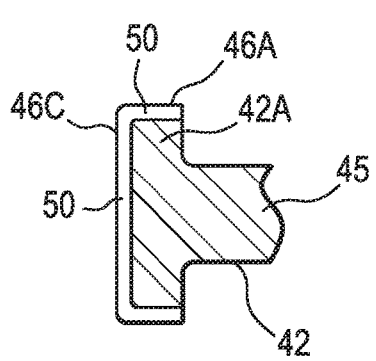
FIG. 5 is an enlarged view of detail C of FIG. 4.
Figure 6:
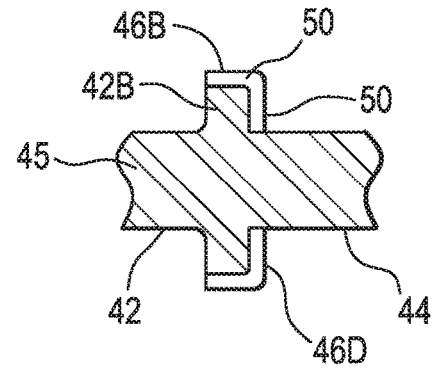
FIG. 6 is an enlarged view of detail D of FIG. 4.
Figure 7:
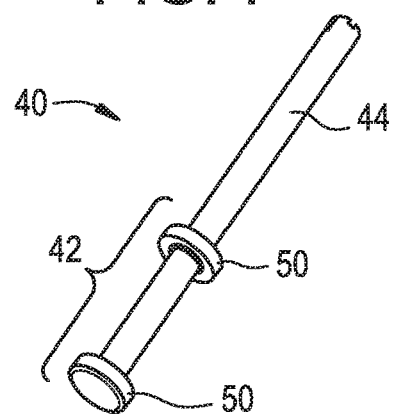
FIG. 7 is a perspective view of the portion of the rotatable member of FIG. 4.

As shown in FIGS. 1-3 a PTFE lined rotation rod assembly 10 includes a fixed member 20 having an annular first body portion 22 and a second annular body portion 24. The second annular body portion 24 has an inner surface 26 defining a bore 28 axially extending partially into the second annular body portion. The rotation rod assembly 10 includes a rotatable member 40 having a piston section 42 extending from a linkage arm 44. The piston section 42 is rotatingly secured in the bore 28, as described herein. The piston section 42 has a self-lubricating liner 50 secured to portions of an outer surface of the piston section (e.g., circumferential and/or axial outer surfaces of the piston section). The self-lubricating liner 50 is in sliding engagement with portions of the inner surface 26. For example, as shown in FIGS. 4-6, the piston section 42 defines a first lobe 42A and a second lobe 42B separated from one another and connected to one another by a shaft 45. The first lobe 42A and the second lobe 42B are configured to have the self-lubricating liner 50 applied thereto to reduce wear and friction, as described herein As shown in FIGS. 4-7, the self-lubricating liner 50 on the first lobe 42A defines a first circumferential surface 46A and the self-lubricating liner 50 on the second lobe 42B defines a second circumferential surface 46B. Each of the first circumferential surface 46A and the second circumferential surface 46B are minimized to reduce wear and are maximized to reduce friction. For example, the first circumferential surface 46A and the second circumferential surface 46B are minimized to reduce contact pressure between the self-lubricating liner 50 and the inner surface 26 of FIG. 3.

As shown in FIGS. 4-6, the self-lubricating liner 50 on the first lobe 42A defines a first axial surface 46C and the self-lubricating liner 50 on the second lobe 42B defines a second axial surface 46D. Each of the first axial surface 46C and the second axial surface 46D are minimized to reduce wear and being maximized to reduce friction. For example, the first axial surface 46C is minimized to reduce contact pressure between the self-lubricating liner 50 and an axial inner surface 36 of the second annular body portion 24 located at a terminus of the bore 26 (FIG. 3); and the second axial surface 46D is minimized to minimize to reduce contact pressure between the self-lubricating liner 50 and an axial end 38 of a plug 34 positioned in the bore 26 (FIG. 3).

As shown in FIGS. 1-4, the rotation rod assembly 10 includes the plug 34 (e.g., connector portion) which is removably secured (e.g., the plug has male threads and is threaded into) to a portion of the inner surface 26 (e.g., a female threaded portion). The plug 34 defines a passage 34P that extends axially therethrough. The rotatable member 40 extends through the passage 34P and is axially restrained by the plug 34. For example, an axial end 38 of the plug 34 is positioned to engage the second axial surface 46D. The plug 34 is axially positionable in the portion of the inner surface 26 by adjusting the torque applied thereto. Such adjustment of the torque and position of the plug 34 adjusts an axial force that compresses the first axial surface 46C against an abutment 36 defined at a terminus of the bore 26; and compresses the second axial surface 46D against the axial end 38 of the plug. The adjustment of the force, via the positioning of the plug 34, sets the friction at a predetermined magnitude and allows for further adjustment to accommodate for wear of the liner 50.

The rotation rod assembly 10 is configured for use in aircraft applications such as for a linkage in a landing gear door of the aircraft. As such, light weight metallic materials are used for manufacture of the rotation rod assembly 10. For example, the rotatable rod assembly 10 and the fixed member 20 are manufactured from an aluminum alloy. In one embodiment, the exterior is type I chromic acid anodized or chemical conversion coated for corrosion prevention, while the inner surface 26 is anodized with a type III hard anodize for corrosion and wear prevention. These coatings provide improved corrosion protection and paint adhesion.

In one embodiment, the first circumferential surface 46A, the second circumferential surface 46B, the first axial surface 46C and/or the second axial surface 46D has a type I chromic acid anodize, type II sulfuric acid anodize or chemical conversion coating thereon. In one embodiment, the chromic acid anodize is pursuant to MIL-A-8625 Type I. In one embodiment, the hard anodized treatment is pursuant to a Sanford Hard Lube™ process or PTFE-Impregnation pursuant to AMS 2482. Sanford Hardlube™ is a proprietary treatment process of Sanford Process Company, which is similar to AMS 2482. The Sanford Hardlube™ treatment process utilizes a unique PTFE material to improve release properties, reduce the coefficient of friction, and enhance the corrosion resistance of anodic coatings. The water-based treatment is applied after anodizing and sealing, with the PTFE remaining impregnated on the part due to mechanical and electrostatic forces. In one embodiment, the hard anodized treatment is polished.

The self-lubricating liner 50 is machinable to achieve final fit-up dimensions for installation in the bore 28. In one embodiment, the self-lubricating liner 50 is manufactured from Uniflon® HP and/or Uniflon® HP-A brand liner materials. Uniflon® is a trademark of Roller Bearing Company of America. Uniflon brand liners are made from a mixture of polymeric resin systems, combined with polytetrafluoroethylene (PTFE), and other lubricating materials. Uniflon brand liners are molded, machinable and self-lubricating to achieve low friction and low wear rates. Woven fabric liners may also be used as well for liner 50.

Figure 8:
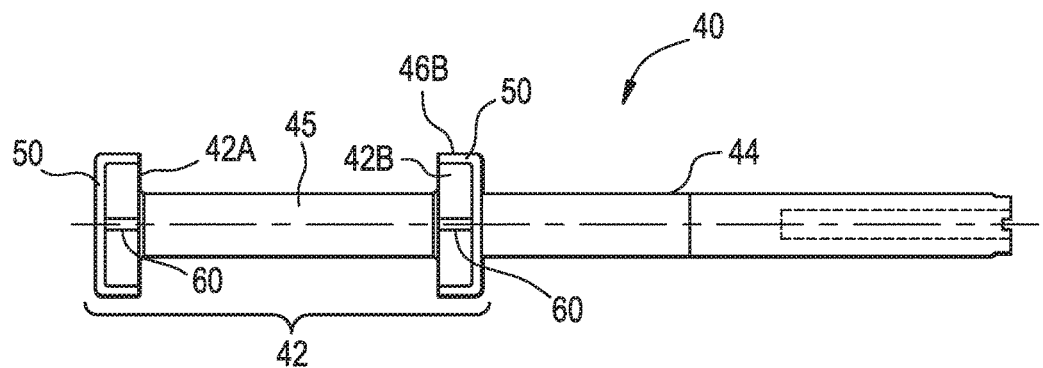
FIG. 8 is a side view of an embodiment of the rotatable member of FIG. 4 having debris grooves formed therein.
Figure 9:
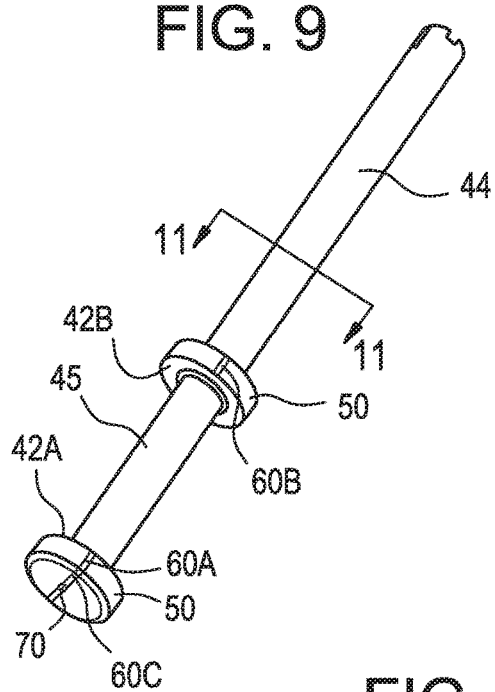
FIG. 9 is a perspective view of the rotatable member of FIG. 8 having the debris grooves formed therein.
Figure 10:
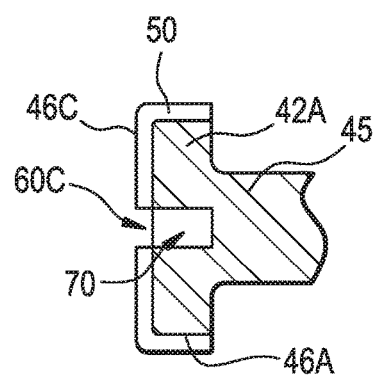
FIG. 10 is a cross sectional view of an embodiment of the PTFE lined rotation rod assembly of FIG. 1 having a debris reservoir formed therein.
Figure 11:
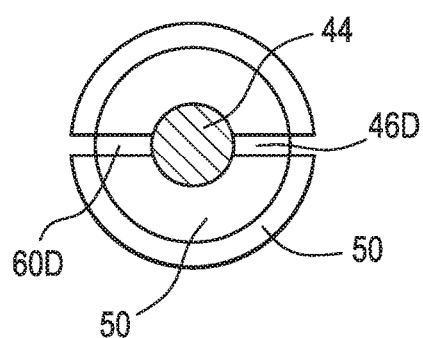
FIG. 11 is a cross sectional view of the rotatable member of FIG. 9, taken across line 11-11.
Figure 12:
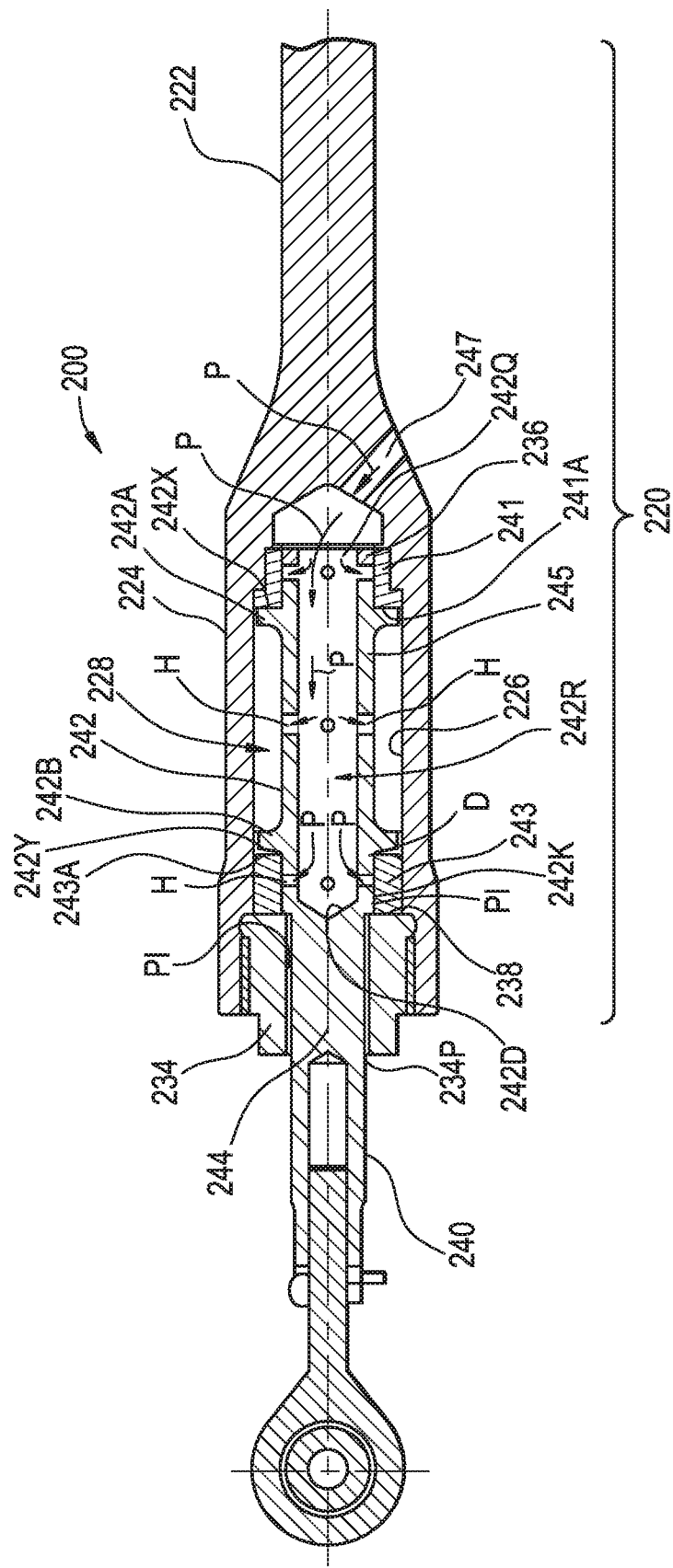
FIG. 12 is a cross sectional view of a prior art rotation rod assembly having straight and flanged bushings.

As shown in the exemplary embodiment of FIGS. 8 and 9, when applied to the piston section 42, the self-lubricating liner 50 includes a plurality of debris grooves as described herein. For example, the liner 50 secured to the first circumferential surface 46A has a linear debris groove 60A formed therein. The debris groove 60A has a projected area that is less that 25 percent of the area of the first circumferential surface 46A. For example, the liner 50 secured to the second circumferential surface 46B has a linear debris groove 60B formed therein. The debris groove 60B has a projected area that is less that 25 percent of the area of the second circumferential surface 46B. For example, the liner 50 secured to the first axial surface 46C has a linear debris groove 60C formed therein. The debris groove 60C has a projected area that is less that 25 percent of the area of the first axial surface 46C. For example, the liner 50 secured to the second axial surface 46D has a linear debris groove 60D formed therein. The debris groove 60D has a projected area that is less that 25 percent of the area of the second axial surface 46D. In one embodiment, the self-lubricating liner 50 secured to the first axial end 46C includes a debris appurtenance 70 (e.g., a hole) formed therein. The debris appurtenance 70 has a projected area that is less than 25 percent of the first axial surface 46C. In one embodiment, the debris appurtenance 70 and the debris groove 60C have a combined projected area of less than 25 percent of the first axial surface 46C. The debris grooves 60A, 60B, 60C and 60D are configured with any suitable cross section including rectilinear, square and arcuate.

Use of the debris grooves 60A, 60B, 60C and 60D and the debris appurtenance 70 allow wear debris to collect as the rod rotates. This keeps wear debris from remaining between the hard anodized wall and the liner. That eliminates excessive wear to the hard anodized surface. While the linear debris grooves 60A, 60B, 60C and 60D are shown on the respective liner 50 portions, the present invention is not limited in this regard as multiple debris grooves or drainage grooves of any configuration may be employed.

The debris appurtenance 70 in the machinable liner and rotating rod serves a similar purpose as the debris grooves 60A, 60B, 60C and 60D as the debris appurtenance 70 provides reservoir for wear debris to fall and accumulate in. This eliminates excessive wear due to debris between the liner and the axial inner surface 36 (FIG. 3). The debris appurtenance 70 also allows for proper seating of the liner 50 once installed first axial surface 46C. The axial inner surface 36 (FIG. 3) may have tool marks thereon as a result of the cutting tool used to machine the bore 26 (FIG. 3). A small raised surface may remain on the first axial surface 46C after polishing. The debris appurtenance 70 allows the liner 50 to seat flush with the first axial surface 46C. The debris appurtenance 70 may have a flat bottom or have a standard drill point or center drill hole. This will eliminate premature wear that may cause excessive free play because contamination and wear debris will have a place to deposit, preventing debris from embedding in the liner and causing high shear stresses on the liner 50.

Figure 13:
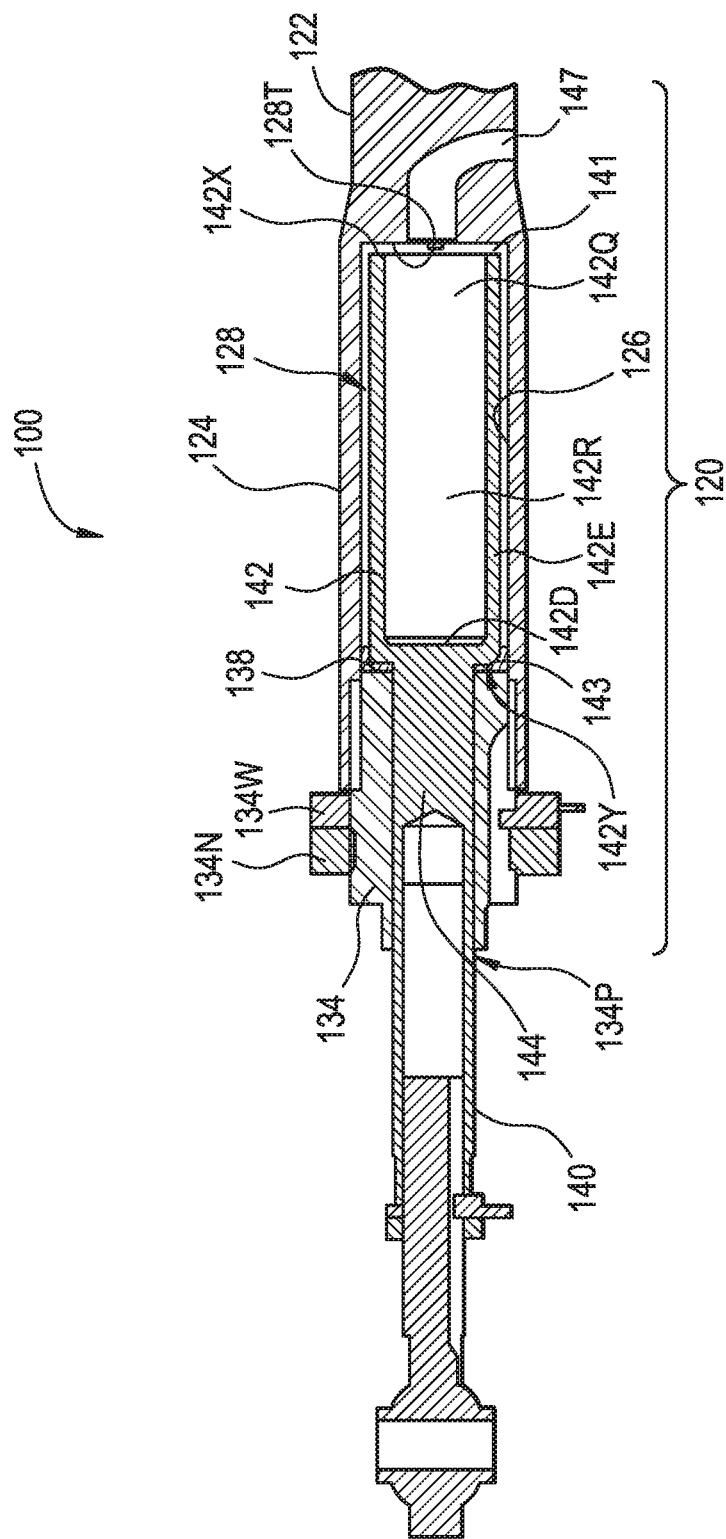
FIG. 13 is a cross sectional view of a portion of the greased rotation rod assembly of the present invention.

As shown in FIG. 13, a greased rotation rod assembly of the present invention is generally designated by the numeral 100. The greased rotation rod assembly 100 includes a fixed member 120 having an annular first body portion 122 and a second annular body portion 124. The second annular body portion 124 has an inner surface 126 defining a bore 128 axially extending partially into the second annular body portion 124. The greased rotation rod assembly 100 includes a rotatable member 140 having a piston section 142 extending from a linkage arm 144. The piston section 142 is rotatingly secured in the bore 128, as described herein. The piston section 142 has a generally cylindrical exterior surface 142E extending between a first axially facing annular bearing surface 142X and second axially facing annular bearing surface 142Y.

The piston section 142 has an opening 142Q at a terminal end thereof that is positioned in the bore 128. The opening 142Q extends axially into an interior area 142R of the piston section 142 and terminates at an inside end surface 142D.

The greased rotation rod assembly 100 includes a plug 134 removably secured (e.g., the plug has male threads) and threaded into a portion of the inner surface 126 (e.g., a female threaded portion). A washer 134W and lock nut 134N secure the plug 134 in place, The plug 134 defines a passage 134P that extends axially therethrough. The rotatable member 140 extends through the passage 134P and is axially restrained by the plug 134 which as an axial end 138.

As shown in FIG. 13, the greased rotation rod assembly 100 includes a first bushing 141 disposed on the first axially facing annular bearing surface 142X; and a second bushing 143 disposed on the second axially facing annular bearing surface 142Y, as described herein.

Figure 15A:
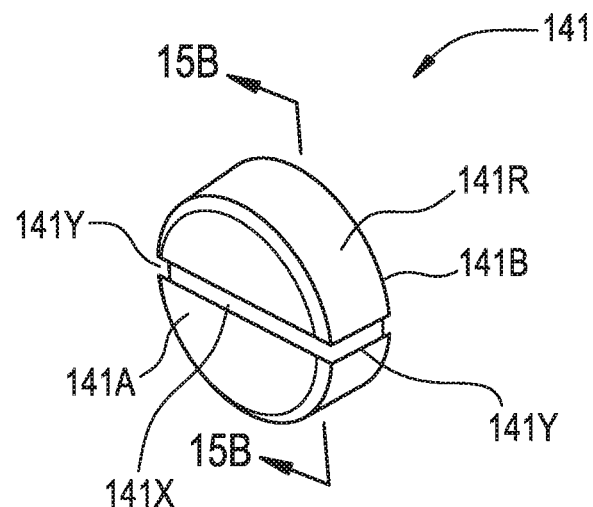
FIG. 15A is a perspective view of a first bushing installed in the greased rotation rod assembly of FIG. 13.
Figure 15B:
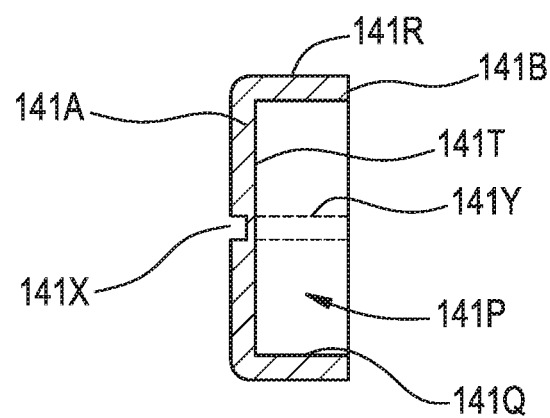
FIG. 15B is a cross sectional view of the first bushing of FIG. 15A taken across line 15B-15B of FIG. 15A.

As shown in FIGS. 15A and 15B the first bushing 141 is has a C-shaped cap configuration that is closed on an axial end 141A. The first bushing 141 has a generally cylindrical exterior surface 141R that extends between the first axial end 141A and a second axial end 141B thereof. A first groove 141X is formed in the first axial end 141A. Two second grooves 141Y extend longitudinally on opposing sides of the exterior surface 141R. The first groove 141X merges with the second grooves 141Y at a juncture between the first axial surface 141A and the exterior surface 141R. The first bushing 141 has bore 141P extending inside thereof at the second axial end 141B and terminating at an inside axial surface 141T thereof. The bore 141P is defined by a radially inwardly facing surface 141Q.

As shown in FIGS. 16-18 the second bushing 143 is has a C-shaped cap configuration that a hole 143H extending through an axial end 143A thereof. The first bushing 143 has a generally cylindrical exterior surface 143R that extends between the first axial end 143A and a second axial end 143B thereof. A first groove 143X is formed in the first axial end 143A. Two second grooves 143Y extend longitudinally on opposing sides of the exterior surface 143R. The first groove 143X merges with the second grooves 143Y at a juncture between the first axial surface 143A and the exterior surface 143R. The first bushing 143 has bore 143P extending inside thereof at the second axial end 143B and terminating at an inside axial surface 143T thereof. The bore 143P is defined by a radially inwardly facing surface 143Q.

Figure 14:
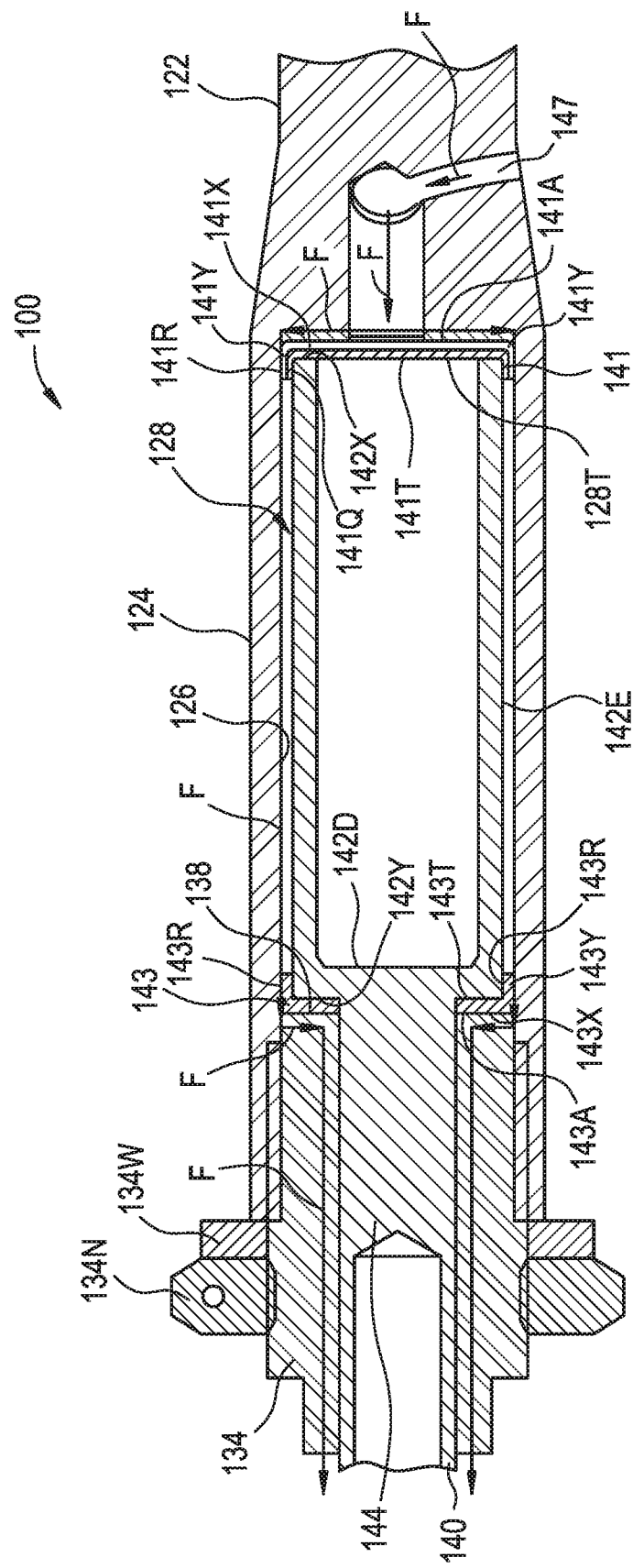
FIG. 14, is an enlarged view of a portion of the greased rotation rod assembly of FIG. 13.

As shown in FIG. 14, a lubricant such as grease is injected in to the opening 147 (e.g., via a zerk fitting) and flows radially outward through the first groove 141X in the first bushing 141, axially through the second grooves 141Y; axially through an annular area defined between the inner surface 126 and the cylindrical exterior surface 142E of the piston section 142; axially through the second grooves 143Y of the second bushing; radially inward through the first groove 143X of the second bushing 143; and axially out of the greased rod end assembly 100, as indicated by the flow path (e.g., flow circuit) designated by the arrows F.

The flow path F combined with the barriers B described herein, eliminate bypassing of grease in areas where high friction are present, thereby reducing wear. The first bushing 141, the cylindrical exterior surface 142E and the inside end surface 142D define the barriers B for preventing bypass flow of the grease inside the piston section 142.

The flow of grease through the first groove 141X in the first bushing 141 supplies grease to the first terminal end 128T of the bore 128 and the axial end 141A of the first bushing which are compressed against and in rotational sliding contact with each other. The flow of grease through the second groove 141Y of the first bushing 141 supplies grease to the exterior surface 141R of the first bushing 141 and the mating portion of the inner surface 126 which are in rotational sliding contact with each other. The flow of grease through the second groove 143Y of the second bushing 143 supplies grease to the exterior surface 143R of the second bushing 143 and the mating portion of the inner surface 126 which are in rotational sliding contact with each other. The flow of grease through the first groove 143X in the second bushing 143 supplies grease to the axial end 138 of the plug 134 and the axial end 143A of the second bushing 143 which are compressed against and in rotational sliding contact with each other. The first grooves 141X and 143X and the second grooves 141Y and 143Y are configured with any suitable cross section including rectilinear, square and arcuate.

As shown in FIG. 14, the first bushing 141 is press fit over the first axially facing annular bearing surface 142X so that a portion of the inside axial surface 141T of the first bushing frictionally engages the first axially facing annular bearing surface 142X; and so that the radially inwardly facing surface 141Q frictionally engages a mating portion of the cylindrical exterior surface 142E. In one embodiment, retaining compound such as Loctite® (Loctite® is the subject to multiple registered trademarks of Henkel AG & Co, of Dusseldorf, Germany).

As shown in FIG. 14, the second bushing 143 is press fit over the second axially facing annular bearing surface 142Y so that a portion of the inside axial surface 143T of the first bushing frictionally engages the first axially facing annular bearing surface 142Y; and so that the radially inwardly facing surface 143Q frictionally engages a mating portion of the cylindrical exterior surface 142E.

In one embodiment, the first bushing 141 and/or the second bushing 143 are manufactured from an aluminum bronze material, for example, Toughmet® 3 (Toughmet is one or more registered trademarks of Materion Brush, Inc. of Mayfield Heights Ohio.) per SAE AMS 4596. In one embodiment, components of the rotation rod assembly 10 and/or the greased rotation rod assembly 100 are manufactured from the aircraft grade aluminum and type I chromic acid anodized or type II sulfuric acid anodized or coated with a chemical film conversion coating such as Alodine® (Alodine® is a registered trademark of Henkel AG & Co, of Dusseldorf, Germany) over all surfaces. Surfaces that will be in contact with the first and second bushings 141 and 143 have a hard anodized treatment such as any type defined in MIL-A-8625 specification (amendment 2003), for example, Type III.

Figure 19:
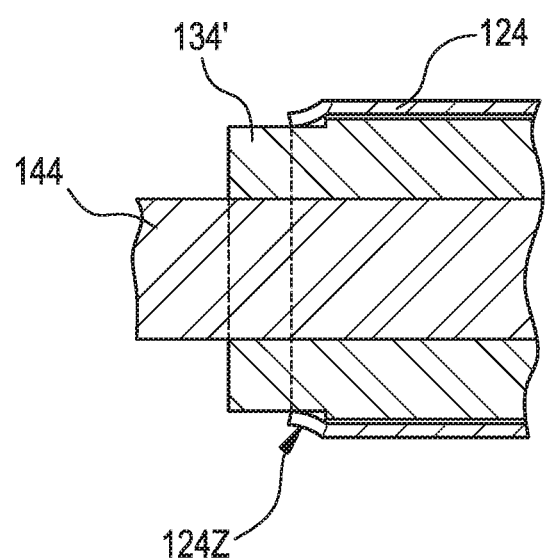
FIG. 19 is a cross sectional view of another embodiment of a connector portion of the rotation rod assemblies of FIGS. 1-3 and 13.

As shown in FIG. 19, in one embodiment the second annular body portion 124 can be permanently locked a retaining cap 134' (e.g., plug or connector portion) by crimping an end 124Z of the of the second annular body portion 124 over the retaining cap 134'.

Although the present invention has been disclosed and described with reference to certain embodiments thereof, it should be noted that other variations and modifications may be made, and it is intended that the following claims cover the variations and modifications within the true scope of the invention.

What is claimed is:

1. A rotation rod assembly comprising:
    a first linkage rod having a first annular body portion fixedly secured to and extending axially therefrom, the first annular body portion having an inner surface defining a first bore axially extending partially into the first annular body portion, the first annular body portion having a first axial end and second axial end, the first axial end being closed and the second axial end having an opening with a plug adjustably secured therein, the plug having a second bore extending therethrough, the first linkage rod being fixedly secured to a frame;
    a second linkage rod having a piston section extending axially therefrom, the piston section being coaxial with the first linkage rod and the plug, the piston section being disposed for rotation in the first bore, the inner surface surrounding the piston section, the second linkage rod extending through the second bore and rotatable relative to the plug, the piston section being axially restrained by the first end and the plug; and
    the piston section having a self-lubricating liner secured to at least one outer surface of the piston section and the self-lubricating liner being in sliding engagement with portions of the inner surface, the first end and a portion of the plug;
    wherein the liner is secured to the radially and/or axially outer surfaces of the piston section and has at least one groove therein for collection of wear materials and debris.

2. The rotation rod assembly of claim 1, wherein the self-lubricating liner defines a first circumferential surface and a second circumferential surface.

3. The rotation rod assembly of claim 1, wherein the self-lubricating liner defines a first axial surface and a second axial surface.

4. The rotation rod assembly of claim 1, wherein the piston section defines a first lobe and a second lobe separated from one another and connected to one another by a shaft.

5. The rotation rod assembly of claim 1, wherein the fixed member comprises an aluminum alloy.

6. The rotation rod assembly of claim 1, wherein the inner surface is anodized according to any of the types specified in the MIL-A-8625 specification (amended 2003) for aluminum anodize.

7. The rotation rod assembly of claim 1, wherein the inner surface is coated with a chemical film conversion coating.

8. The rotation rod assembly of claim 7, wherein the chemical film conversion coating comprises an anodized coating.

9. The rotation rod assembly of claim 2, wherein each of the first circumferential surface and the second circumferential surface has a hard anodized treatment thereon.

10. The rotation rod assembly of claim 9, wherein the hard anodized treatment is pursuant to MIL-A-8625 Type III (amended 2003).

11. The rotation rod assembly of claim 1, wherein the self-lubricating liner comprises Polytetrafluoroethylene (PTFE).

12. A rotation rod assembly comprising:
    a first linkage rod having a first annular body portion fixedly secured to and extending axially therefrom, the first annular body portion having an inner surface defining a first bore axially extending partially into the first annular body portion, the first annular body portion having a first axial end and second axial end, the first axial end being closed and the second axial end having an opening with a plug adjustably secured therein, the plug having a second bore extending therethrough, the first linkage rod being fixedly secured to a frame;
    a second linkage rod having a piston section extending axially therefrom, the piston section being coaxial with the first linkage rod and the plug, the piston section being disposed for rotation in the first bore, the inner surface surrounding the piston section, the second linkage rod extending through the second bore and rotatable relative to the plug, the piston section being axially restrained by the first end and the plug;
    the piston section having at least one of first bushing and second bushing secured to at least one outer surface of the piston section, at least one of the first bushing and the second bushing having a lubrication groove formed in an axially and a radially outer surface thereof, at least one of the first bushing and the second bushing being in sliding engagement with portions of the inner surface, the first end and a portion of the plug;
    a barrier for preventing flow of the grease inside the piston section; and
    a flow path for conveying grease around the piston section, the flow path comprising a first radial circuit in the first bushing, a first axial circuit in the first bushing, a second axial circuit around a radial outer surface of the piston section, a third axial circuit in the second bushing, and a second radial circuit in the second bushing.

13. The rotation rod assembly of claim 12, wherein the at least one of the first bushing and the second bushing comprise an aluminum bronze material.

* * * * *